US006843057B2

(12) United States Patent
Yamamoto

(10) Patent No.: US 6,843,057 B2
(45) Date of Patent: Jan. 18, 2005

(54) STIRLING ENGINE AND ACTUATOR

(75) Inventor: Yasushi Yamamoto, Kanagawa (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 10/633,674

(22) Filed: Aug. 5, 2003

(65) Prior Publication Data

US 2004/0020199 A1 Feb. 5, 2004

(30) Foreign Application Priority Data

Aug. 5, 2002 (JP) ....................................... 2002-226961
Aug. 5, 2002 (JP) ....................................... 2002-226962

(51) Int. Cl.[7] .............................. F01L 9/04; F25B 9/14; G01D 5/14; F16K 31/06; F16K 31/08
(52) U.S. Cl. ................................................ 60/520; 62/6
(58) Field of Search .......................... 60/517, 519, 520; 62/6

(56) References Cited

U.S. PATENT DOCUMENTS 3,991,586 A 11/1976 Acord .......................... 60/520
4,044,558 A 8/1977 Benson ......................... 60/520
4,215,548 A 8/1980 Beremand ..................... 60/520
4,350,012 A 9/1982 Folsom et al. ................ 60/520
5,088,288 A * 2/1992 Katagishi et al. ................ 62/6
5,095,699 A 3/1992 Blackshear .................. 60/517
6,050,092 A * 4/2000 Genstler et al. .............. 60/520
6,094,912 A * 8/2000 Williford ...................... 60/520
6,274,954 B1 8/2001 Gander et al. ................ 310/30
6,354,818 B2 * 3/2002 Morita et al. ..................... 62/6

FOREIGN PATENT DOCUMENTS

EP 1 045 116 A1 10/2000 ............. F01L/9/04
EP 1 158 275 A1 11/2001 ............ G01D/5/14

* cited by examiner

*Primary Examiner*—Sheldon J Richter
(74) *Attorney, Agent, or Firm*—James N. Dresser, Esq.

(57) ABSTRACT

A Stirling engine comprising a casing, a displacer arranged in the casing so as to slide, an expansion chamber and an operation chamber into which, and from which, an operation gas flows with the operation of the displacer, and a power piston that is operated in response to a change in the pressure of the operation gas in the operation chamber, wherein the Stirling engine further comprises a displacer operation means having a moving yoke disposed in the displacer and a pair of electromagnetic solenoids disposed to surround the moving yoke and juxtaposed to each other in the axial direction in the casing; a power piston position detection means for detecting the operation position of the power piston; and a control means for controlling to switch over the excitation of the pair of electromagnetic solenoids of the displacer operation means based on a detection signal from the power piston position detection means.

2 Claims, 11 Drawing Sheets

STIRLING ENGINE AND ACTUATOR

FIELD OF THE INVENTION

The present invention relates to a Stirling engine, and to an actuator. More specifically, the invention relates to a Stirling engine of the displacer type capable of preventing leakage of an operation gas, and to an actuator.

DESCRIPTION OF THE RELATED ART

A Stirling engine of the displacer type usually comprises a casing, a displacer arranged in the casing so as to slide, an expansion chamber and an operation chamber into which, and from which, an operation gas flows with the operation of the displacer, a power piston that is operated in response to a change in the pressure of the operation gas in the operation chamber, and an operation rod that is coupled to the displacer to operate the displacer at a predetermined timing. In the Stirling engine of the above displacer type, the power piston is operated in response to a change in the pressure in the operation chamber with the expansion and contraction as the operation gas is heated and cooled. Accordingly, the operation gas used for the Stirling engine is the one having a small specific heat, such as hydrogen or helium, for improving the heat efficiency.

The gas having a small specific heat, such as hydrogen or helium, used as an operation gas for the Stirling engine is prone to leak through the sliding portions because molecules of the gas are small in size, and hence, the leakage of the operation gas cannot be prevented by the sealing that is usually used for the sliding portions. In particular, the operation rod coupled to the displacer is arranged penetrating through the casing. It is therefore important to prevent the operation gas from leaking through the sliding portion that penetrates through. To solve this problem, a system is contrivable in which the displacer is formed of a sealed container, and it is used as a free piston and is operated by utilizing a gas spring or gravity.

With the free piston-type displacer utilizing the gas spring, however, it is difficult to set a spring constant of the gas spring and, besides, the operation cycle is virtually determined by the spring constant of the gas spring. It is, therefore, difficult to make the operation cycle variable and, further, a starter mechanism must be separately provided. With the free piston-type displacer by utilizing the gravity, the direction of the casing is limited to the vertical direction only, and cannot be disposed laterally.

SUMMARY OF THE INVENTION

It is an object of the present invention to provide a Stirling engine as well as an actuator which permit the operation cycle of the displacer to be appropriately changed, which does not impose limitation on the installation direction of the casing, and which have a built-in starter function.

In order to achieve the above object according to the present invention, there is provided a Stirling engine comprising a casing, a displacer arranged in the casing so as to slide, an expansion chamber and an operation chamber into which, and from which, an operation gas flows with the operation of the displacer, and a power piston that is operated in response to a change in the pressure of the operation gas in the operation chamber, wherein the Stirling engine further comprises:

a displacer operation means having a moving yoke disposed in the displacer, and a pair of electromagnetic solenoids disposed to surround the moving yoke and juxtaposed to each other in the axial direction in the casing;

a power piston position detection means for detecting the operation position of the power piston; and a control means for control to switch over the excitation of the pair of electromagnetic solenoids of the displacer operation means based on a detection signal from the power piston position detection means.

According to the present invention, there is further provided an actuator comprising a casing, a displacer arranged in the casing so as to slide, an expansion chamber and an operation chamber into which, and from which, an operation gas flows with the operation of the displacer, and a power piston that is coupled to a to-be-operated member and is operated in response to a change in the pressure of the operation gas in the operation chamber, wherein the actuator further comprises:

a displacer operation means having a moving yoke disposed in the displacer, and a pair of electromagnetic solenoids disposed in the casing and arranged to surround the moving yoke; and a control means for controlling to switch over the excitation of the pair of electromagnetic solenoids of the displacer operation means.

According to the present invention, there is further provided a Stirling engine comprising a casing, a displacer arranged in the casing so as to slide, an expansion chamber and an operation chamber into which, and from which, an operation gas flows with the operation of the displacer, and a power piston that is operated in response to a change in the pressure of the operation gas in the operation chamber, wherein the Stirling engine further comprises:

a displacer operation means having a moving magnet disposed in the displacer, a fixed cylindrical yoke disposed in the casing and arranged to surround the moving magnet, and a pair of coils disposed on the inside of the fixed yoke;

a power piston position detection means for detecting the operation position of the power piston; and a control means for controlling to switch over the direction of an electric current applied to the pair of coils of the displacer operation means based on a detection signal from the power piston position detection means.

According to the present invention, there is further provided an actuator comprising a casing, a displacer arranged in the casing so as to slide, an expansion chamber and an operation chamber into which, and from which, an operation gas flows with the operation of the displacer, and a power piston that is coupled to a to-be-operated member and is operated in response to a change in the pressure of the operation gas in the operation chamber, wherein the actuator further comprises:

a displacer operation means having a moving magnet disposed in the displacer, a fixed cylindrical yoke disposed in the casing and arranged to surround the moving magnet, and a pair of coils disposed on the inside of the fixed yoke; and a switching-over means for switching over the direction of an electric current supplied to the pair of coils of the displacer operation means.

DETAILED DESCRIPTION OF THE PREFERRED EMBODIMENTS

Preferred embodiments of the Stirling engine and actuator constituted according to the present invention will now be described in further detail with reference to the accompanying drawings.

Figure 1:
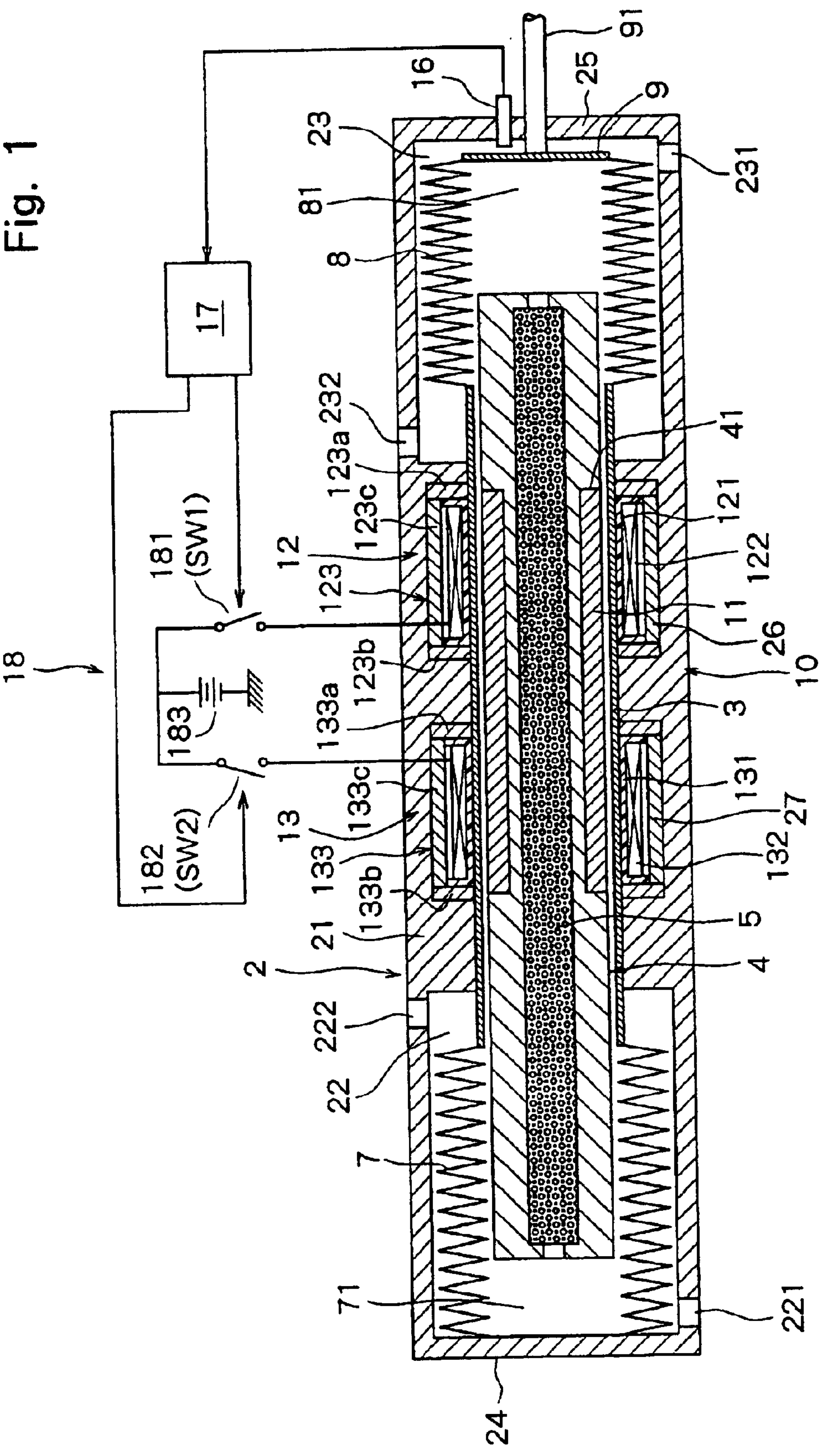
FIG. 1 is a sectional view showing a first embodiment of the Stirling engine constituted according to the present invention.

FIG. 1 is a sectional view showing a first embodiment of the Stirling engine constituted according to the present invention.

The Stirling engine of the embodiment shown in FIG. 1 has a cylindrical casing 2. The casing 2 is made of a nonmagnetic material such as an aluminum alloy or the like, and comprises a central slide unit 21, a heating chamber 22 formed on the left side of the central slide unit 21 in the drawing, and a cooling chamber 23 formed on the right side of the central slide unit 21 in the drawing. The casing 2 is provided with a heated fluid inlet 221 and a heated fluid outlet 222 opened to the heating chamber 22, and with a cooled fluid inlet 231 and a cooled fluid outlet 232 opened to the cooling chamber 23. Further, a slide cylinder 3 made of a nonmagnetic material is disposed on the inner peripheral surface of the central slide unit 21 of the casing 2 so as to slide in the axial direction. A displacer 4 is arranged passing through the slide cylinder 3 so as to slide in the axial direction. The displacer 4 is made of a nonmagnetic material in a cylindrical shape, and has, in its inside, a regenerator 5 constituted by alternately superposing a heat-insulating ring made of a heat-insulating material and a wire gauze.

An expansion bellows 7 is arranged in the heating chamber 22. The expansion bellows 7 is attached at its one end to a left end of the slide cylinder 3 in the drawing and is attached at its other end to a left end wall 24 of the casing 2. In the heating chamber 22, therefore, there is formed an expansion chamber 71 that is defined by the expansion bellows 7, the slide cylinder 3 and the left end wall 24 and is communicated with the regenerator 5 disposed in the cylindrical displacer 4. On the other hand, a contraction bellows 8 is arranged in the cooling chamber 23. The contraction bellows 8 is attached at its one end to a right end of the slide cylinder 3 in the drawing and is attached at its other end to a power piston 9. In the cooling chamber 23, therefore, there is formed an operation chamber 81 that is defined by the contraction bellows 8 and by the slide cylinder 3, and is communicated with the regenerator 5 disposed in the cylindrical displacer 4. An operation gas having a small specific heat, such as hydrogen or helium, is sealed in the expansion chamber 71, in the operation chamber 81 and in the cylindrical displacer 4. To the power piston 9 is attached a power take-off shaft 91 which is arranged penetrating through the right end wall 25 of the casing 2.

The Stirling engine of the embodiment shown in FIG. 1 is provided with a displacer operation means 10 for periodically operating the displacer 4. The displacer operation means 10 is constituted by a moving yoke 11 disposed on the outer peripheral surface at the central portion of the displacer 4, and a pair of electromagnetic solenoids 12 and 13 arranged to surround the moving yoke 11 and juxtaposed to each other in the axial direction on the inner peripheral side of the casing 2. The moving yoke 11 is made of a magnetic material in a cylindrical shape, and is disposed in an annular fitting groove 41 formed in the outer peripheral surface of the displacer 4. The pair of electromagnetic solenoids 12 and 13 are constituted by exciting coils 122 and 132 wound on the bobbins 121 and 131, and fixed yokes 123 and 133 arranged covering both sides of the exciting coils 122 and 132 in the axial direction and covering the outer peripheral sides thereof. The pair of electromagnetic solenoids 12 and 13 are disposed in annular fitting grooves 26 and 27 formed in the inner peripheral surface of the casing 2. The exciting coils 122 and 132 are connected to a power source 183 via switches 181 (SW1) and 182 (SW2) of a drive circuit 18. In the illustrated embodiment, the fixed yokes 123 and 133 are constituted by annular yoke pieces 123*a*, 123*b* and 133*a*, 133*b* made of a magnetic material disposed on both sides of the exciting coils 122 and 132 in the axial direction, and cylindrical yoke pieces 123*c* and 133*c* made of a magnetic material disposed on the outer peripheral side of the exciting coils 122 and 132. In the thus constituted moving magnet 11, when the switch 181 (SW1) is turned on, an electric current is supplied to the exciting coil 122 of one electromagnetic solenoid 12, whereby the electromagnetic solenoid 12 is exited to move the displacer 4 toward the right in FIG. 1. When the switch 182 (SW2) is turned on, on the other hand, an electric current is supplied to the exciting coil 132 of the electromagnetic solenoid 13, whereby the electromagnetic solenoid 13 is excited to move the displacer 4 toward the left in FIG. 1.

Figure 2:
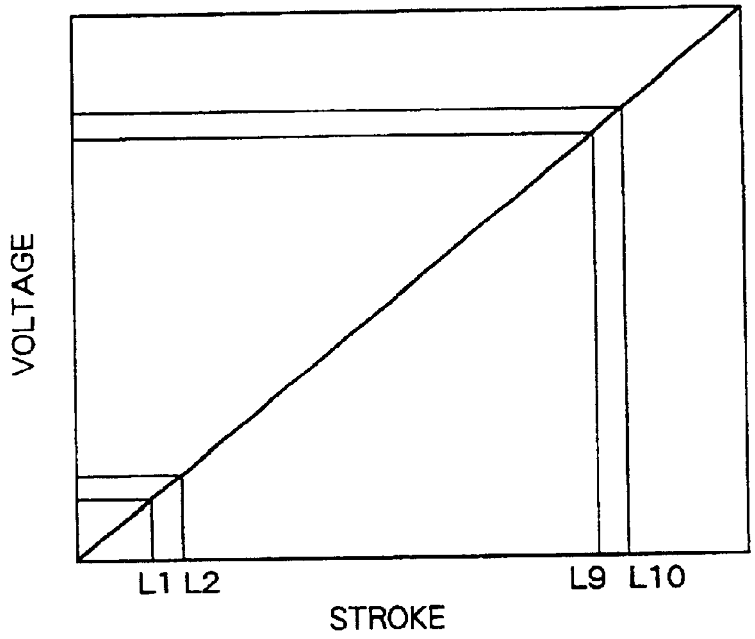
FIG. 2 is a diagram illustrating output signals of a power piston position detection means constituting the Stirling engine shown in FIG. 1.

The Stirling engine of the embodiment shown in FIG. 1 is provided with a power piston position detection means 16 for detecting the operation position of the power piston 9. The power piston position detection means 16 is constituted by a stroke sensor disposed opposite to the power take-off shaft 91 coupled to the power piston 9, and sends a detection signal to a control means 17 that will be described later. Description will be made of the output value of the stroke sensor that is the power piston position detection means 16, with reference to FIG. 2. In FIG. 2, the abscissa represents the stroke of the power piston 9, that is, the power take-off shaft 91, and the ordinate represents the voltage. As shown in FIG. 2, the stroke sensor produces a voltage that varies in proportion to the stroke of the power piston 9, that is, the power take-off shaft 91. On the abscissa of FIG. 2, L1 represents the full-stroke position (bottom dead center) on the return side and L10 represents the full-stroke position (top dead center) on the feed side. The control means 17 is constituted by a microcomputer, and has a central processing unit (CPU) for processing the operation according to a control program, a read-only memory (ROM) for storing the control program, and a random access memory (RAM) for storing the results of operation. Based on an operation position signal of the power piston 9 detected by the power piston position detection means 16, the control means 17 sends a control signal to the switches 181 (SW1) and 182 (SW2) of the drive circuit 18 for operating the pair of electromagnetic solenoids 12 and 13 that constitute the displacer operation means 10.

Figure 3:
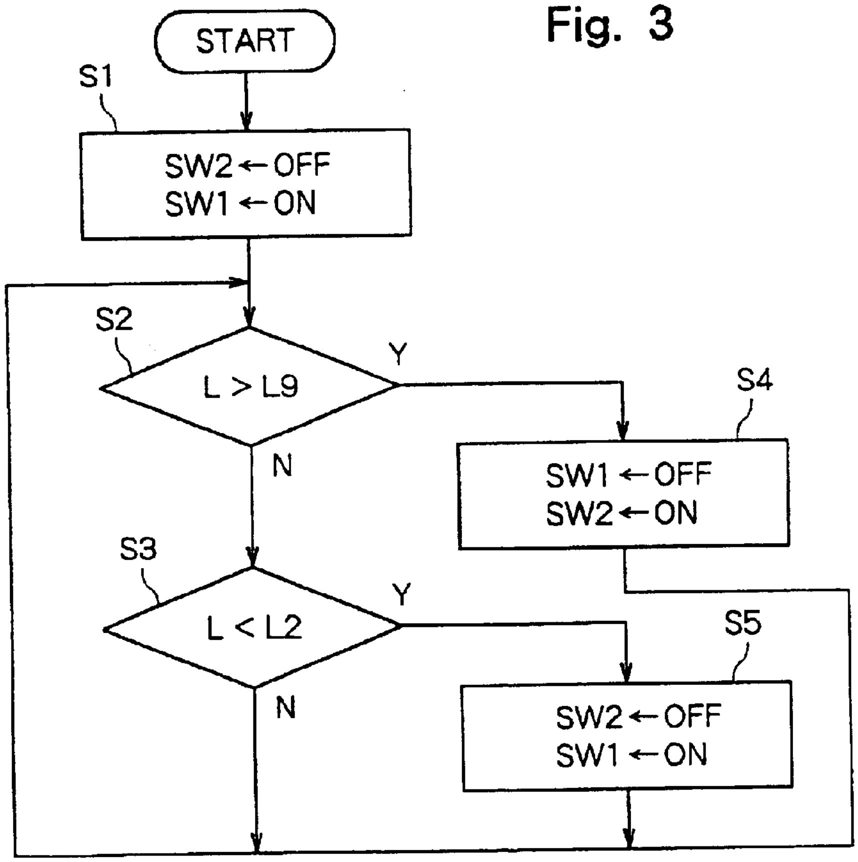
FIG. 3 is a flowchart showing the procedure of operation of a control means constituting the Stirling engine shown in FIG. 1.

The Stirling engine of the first embodiment shown in FIG. 1 is constituted as described above. The operation will now be described with reference to a flowchart of FIG. 3 and FIG. 4 which illustrates the states of operation.

Figure 4:
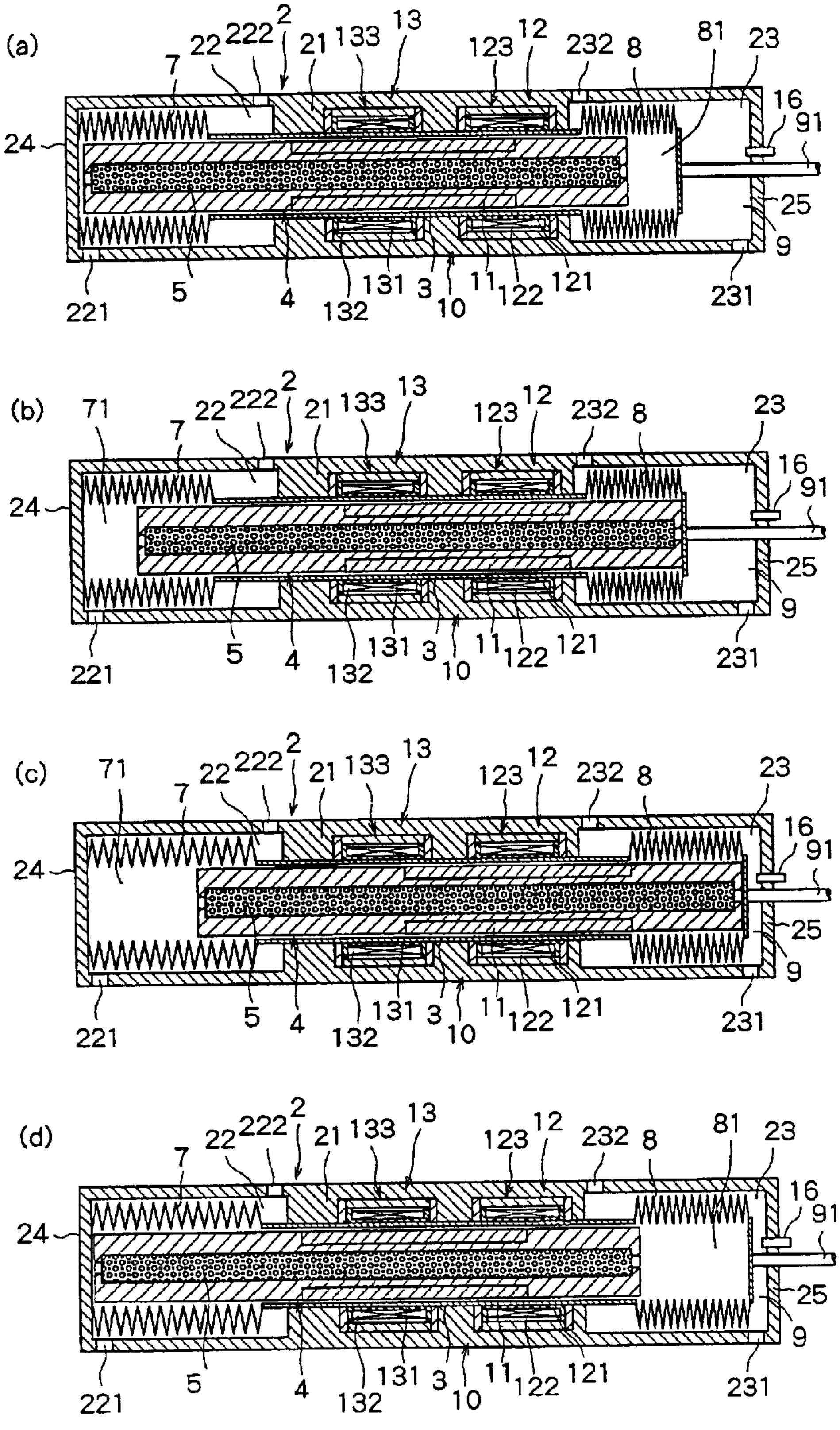
FIG. 4 is a view illustrating the operation states of the Stirling engine shown in FIG. 1.

FIG. 4(*a*) shows an end of contraction where the power piston 9 is at the left end position in the drawing, i.e., at the full-stroke position (bottom dead center) on the return side, and the displacer 4 is also at the left end position, i.e., at the full-stroke position (bottom dead center) on the return side. To start the Stirling engine from the state of FIG. 4(*a*), the control means 17 controls to drive the displacer operation means 10 so as to move the displacer 4 toward the right in the drawing (step S1). That is, the control means 17 turns the switch 182 (SW2) of the drive circuit 18 off, and turns the switch 181 (SW1) on, to supply an electric current to the exciting coil 122 of the one electromagnetic solenoid 12 constituting the displacer operation means 10 to excite the electromagnetic solenoid 12. As described above, consequently, the displacer 4 moves toward the right as shown in FIG. 4(*b*). As the displacer 4 moves toward the right, the operation gas in the operation chamber 81 flows into the expansion chamber 71 through the regenerator 5 disposed in the cylindrical displacer 4. At this moment, the operation gas cooled in the operation chamber 81 is heated by heat exchange caused at the time when it passes through the regenerator 5. As shown in FIG. 4(*b*), a state where the displacer 4 has moved toward the right by a predetermined amount is the time of starting expansion. From this moment, the operation gas that has flowed into the expansion chamber 71 undergoes the expansion by being heated by the heated fluid introduced into the heating chamber 22. As a result, the displacer 4 has its expansion bellows 7 expanded as shown in FIG. 4(*c*), whereby the slide cylinder 3 and the contraction bellows 8 move toward the right as shown in FIG. 4(*c*), and the displacer 4 is moved toward the right. At the end of expansion shown in FIG. 4(*c*), the power piston 9 is moved to the right end position, i.e., to the full-stroke position (top dead center) on the feed side, and the displacer 4, too, is moved to the right end position, i.e., to the full-stroke position (top dead center) on the feed side.

After the displacer operation means 10 is driven at step S1 to move the displacer 4 toward the right in the drawing as described above, the control means 17 proceeds to step S2 to check, based on a detection signal from the power piston position detection means 16, whether the stroke position L of the power piston 9, i.e., of the power take-off shaft 91 is larger than a stroke position L9 which is a threshold value smaller, by a predetermined amount, than the full-stroke position (top dead center) L10 on the feed side (L>L9). As the stroke position L is not larger than L9, the control means 17 proceeds to step S3 to check whether the stroke position L of the power piston 9, i.e., of the power take-off shaft 91 is smaller than a stroke position L2 which is a threshold value larger, by a predetermined amount, than the full-stroke position (bottom dead center) L1 on the return side (L<L2). This time, the power piston 9 is moved toward the feed side and hence, it does not happen that the stroke position L is smaller than L2. Accordingly, the control means 17 returns to step S2.

When the stroke position L is larger than L9 at step S2, the control means 17 judges that the power piston 9 has exceeded the position which is smaller, by a predetermined amount, than the position at the end of expansion shown in FIG. 4(*c*). The control means 17, then, proceeds to step S4 to drive the displacer operation means 10 so as to move the displacer 4 toward the left in the drawing. Namely, the control means 17 turns the switch 181 (SW1) of the drive circuit 18 off, and turns the switch 182 (SW2) on, to supply an electric current to the exciting coil 132 of the other electromagnetic solenoid 13 constituting the displacer operation means 10 thereby to excite the electromagnetic solenoid 13. As a result, the displacer 4 moves toward the left as shown in FIG. 4(*d*). As the displacer 4 moves toward the left, the operation gas in the expansion chamber 71 flows into the operation chamber 81 through the regenerator 5 disposed in the cylindrical displacer 4. At this moment, the operation gas heated in the expansion chamber 71 is cooled by heat exchange caused at the time when it passes through the regenerator 5. The state shown in FIG. 4(*d*) is the time of starting contraction where the displacer 4 reaches the left end position, i.e., reaches the full-stroke position (bottom dead center) on the return side. At the start of contraction which is the state shown in FIG. 4(*d*), the power piston 9 is located at the right end position in the drawing, i.e., located at the full-stroke position (top dead center) on the feed side. From the state shown in FIG. 4(*d*), the operation gas in the operation chamber 81 contracts by being cooled by the cold gas introduced into the cooling chamber 23. As a result, the contraction bellows 8 forming the operation chamber 81 contracts and at the end of contraction shown in FIG. 4(*a*), the power piston 9 is moved to the left end position in the drawing, i.e., to the full-stroke position (bottom dead center) on the return side.

After the displacer operation means 10 is driven at step S4 to move the displacer 4 toward the left in the drawing as described above, the control means returns back to step S2 to check whether the stroke position L of the power piston 9, i.e., of the power take-off shaft 91 is larger than a stroke position L9 which is a threshold value smaller, by a predetermined amount, than the full-stroke position (top dead center) L10 on the feed side. This time, the power piston 9 is moved toward the return side, and it does not happen that the stroke position L is larger than L9. Accordingly, the control means 17 proceeds to step S3 to check whether the stroke position L of the power piston 9, i.e., of the power take-off shaft 91 is smaller than a stroke position L2 which is a threshold value larger, by a predetermined amount, than the full-stroke position (bottom dead center) L1 on the return side. When the stroke position L is not smaller than L2, the control means 17 judges that the power piston 9 does not yet reach L2. The control means 17, therefore, returns back to step S2 to repeat steps S2 and S3. When the stroke position L of the power piston 9 is smaller than L2 at step S3, the control means 17 judges that the power piston 9 has exceeded L2. The control means 17, therefore, proceeds to step S5 to turn the switch 182 (SW2) of the drive circuit 18 off and the switch 181 (SW1) on to move the displacer 4 toward the right in the drawing, and supplies an electric current to the exciting coil 122 of the one electromagnetic solenoid 12 to excite the electromagnetic solenoid 12.

The above cycle is repeated to reciprocatingly move the power piston 9, i.e., the power take-off shaft 91. Therefore, when the power take-off shaft 91 is coupled to a crank shaft via a suitable connection rod, the crank shaft can be rotated.

The above-mentioned mechanism of the Stirling engine can be used as the actuator for actuating the to-be-operated member to the two positions by so controlling as to stop the displacer 4 at the full-stroke position (top dead center) on the feed side and at the full-stroke position (bottom dead center) on the return side, and to stop the power piston 9, i.e., the power take-off shaft 91 at the full-stroke position (top dead center) L1 on the feed side and at the full-stroke position (bottom dead center) L1 on the return side. When the mechanism of the Stirling engine is used as an actuator as described above, the switch 181 (SW1) and the switch 182 (SW2) of the drive circuit 18 may be operated by hand, or a switching-over signal may be input to the control means 17. In this case, a means for inputting switching-over signals to the switch 181 (SW1) and the switch 182 (SW2) or to the control means 17 work as a switching-over means for switching over the excitation of the pair of electromagnetic solenoids 12 and 13.

In the Stirling engine and the actuator of the above-mentioned embodiment, the displacer operation means 10 for operating the displacer 4 is constituted by the moving yoke 11 disposed in the displacer 4 and by the pair of electromagnetic solenoids 12 and 13 disposed to surround the moving yoke 11 and juxtaposed in the axial direction on the inside of the casing 2. Therefore, the rod for driving the displacer 4 does not penetrate through the casing 2 with the consequence that the leakage of the operation gas can be prevented. Further, the operation cycle of the displacer 4 can be easily changed by suitably controlling the timing for turning on/off the switch 181 (SW1) and the switch 182 (SW2) of the drive circuit 18, namely, for suitably controlling the timing for exciting the pair of electromagnetic solenoids 12 and 13. There is no limitation, besides, on the direction for installing the casing 2.

Figure 5:
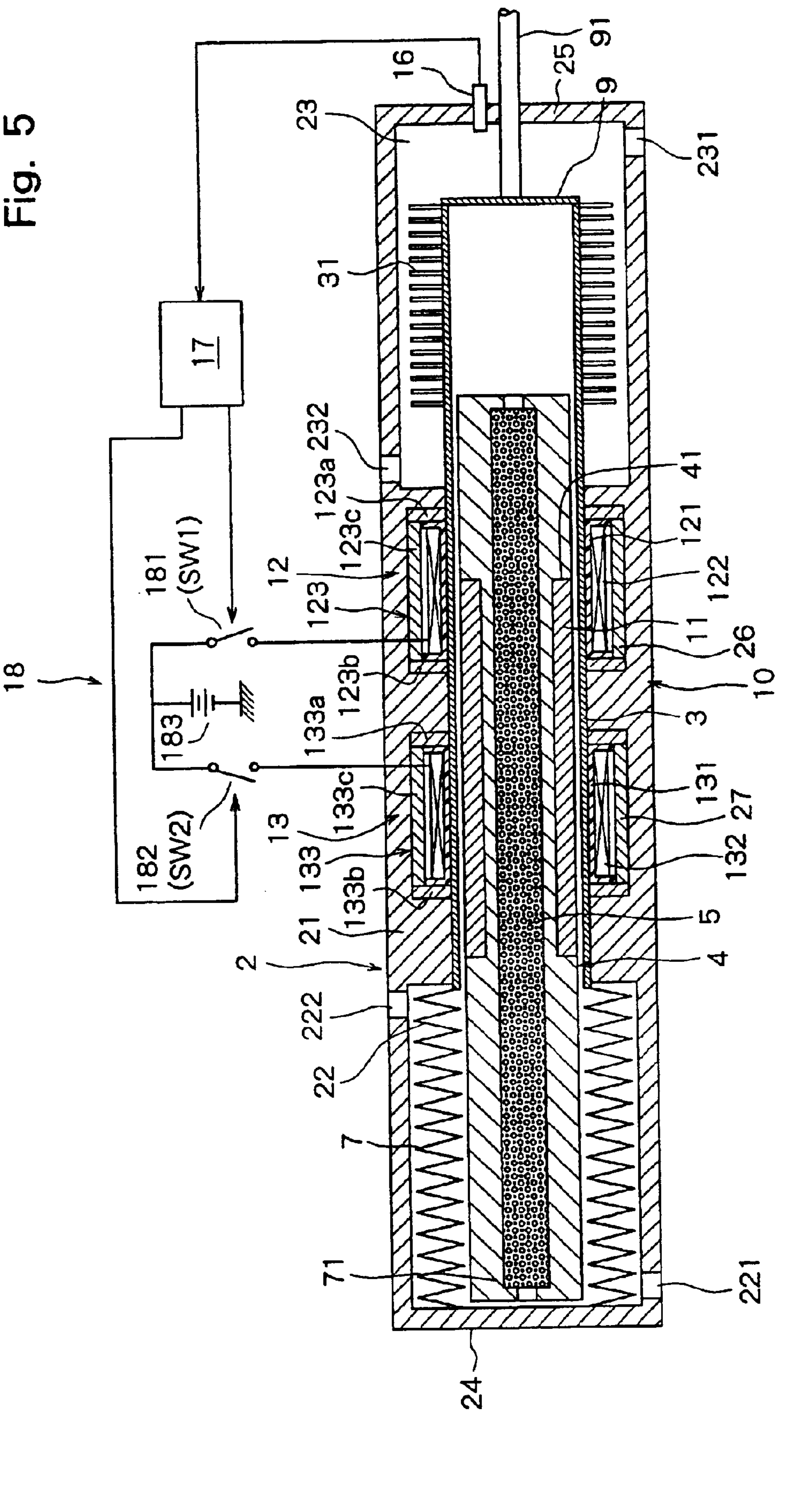
FIG. 5 is a sectional view showing a second embodiment of the Stirling engine constituted according to the present invention.

Next, a second embodiment of the Stirling engine constituted according to the present invention will be described with reference to FIG. 5. In the embodiment of FIG. 5, the same members as the constituent members of the Stirling engine shown in FIG. 1 are denoted by the same reference numerals, but their description is not repeated.

In the Stirling engine shown in FIG. 5, the slide cylinder 3 is formed in an extended manner instead of employing the contraction bellows 8 arranged in the cooling chamber 23 in the embodiment shown in FIG. 1, and the power piston 9 is attached to the right end of the slide cylinder 3 in the drawing. Then, cooling fins 31 are mounted on the outer periphery at the right end of the slide cylinder 3 in the drawing.

Figure 6:
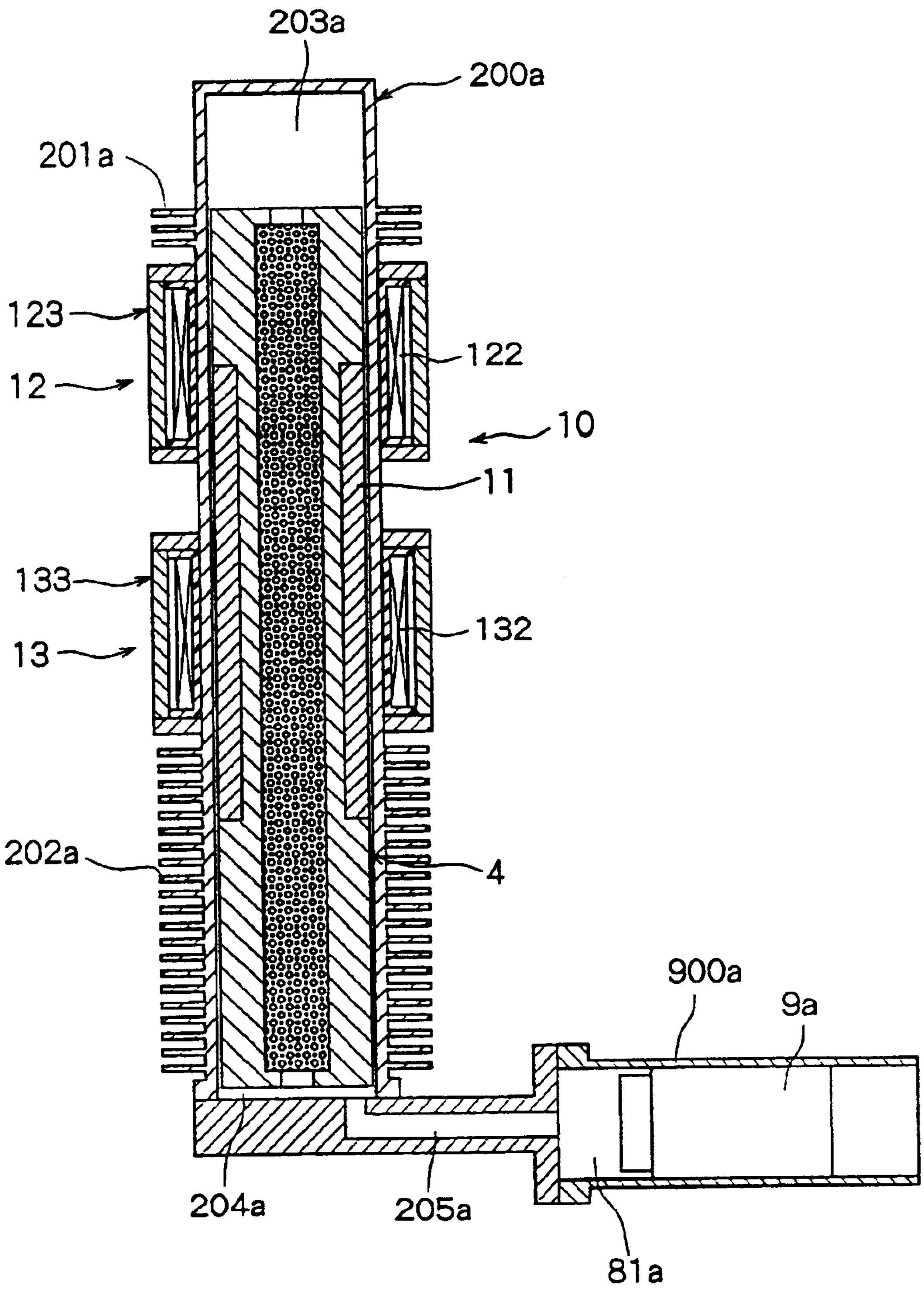
FIG. 6 is a sectional view showing a third embodiment of the Stirling engine constituted according to the present invention.

Next, a third embodiment of the Stirling engine constituted according to the present invention will be described with reference to FIG. 6. In the embodiment of FIG. 6, the same members as the constituent members of the Stirling engine shown in FIGS. 1 and 5 are denoted by the same reference numerals, but their description is not repeated.

The Stirling engine shown in FIG. 6 is the one of the type in which the displacer and the power piston are not arranged on the same axis, and to which the present invention is applied. Namely, in the Stirling engine shown in FIG. 6, a power cylinder 900*a* is arranged at right angles with a casing 200*a*, and a power piston 9*a* is arranged in the power cylinder 900*a* so as to slide therein. The casing 200*a* is made of a metallic material such as an aluminum alloy or the like and is formed with its both ends closed. In the drawing, heating fins 201*a* are formed on the outer peripheral surface at the upper end thereof, and cooling fins 202*a* are formed on the outer peripheral surface of the lower half portion thereof. In the thus constituted casing 200*a*, the displacer 4 is arranged so as to move up and down in the drawing. Due to the displacer 4, therefore, the interior of the casing 200*a* is divided into an expansion chamber 203*a* of the upper side in the drawing and a cooling chamber 204*a* of the lower side in the drawing. The cooling chamber 204*a* is communicated, via a passage 205*a*, with an operation chamber 81*a* formed by the power cylinder 900*a* and the power piston 9*a*. The moving yoke 11 of the displacer operation means 10 that periodically operates the displacer 4 is arranged on the outer peripheral surface at the central portion of the displacer 4, and the pair of electromagnetic solenoids 12 and 13 are arranged in the casing 200*a*. As described above, the displacer operation means 10 for operating the displacer 4 is constituted by the moving yoke 11 disposed in the displacer 4 and the pair of electromagnetic solenoids 12 and 13 disposed in the casing 200*a*. Therefore, the rod for driving the displacer 4 does not penetrate through the casing 200*a* with the consequence that the leakage of the operation gas can be prevented. The operation cycle of the displacer 4 can be easily changed by suitably controlling the timing for supplying an electric current to the exciting coils 122 and 132 of the pair of electromagnetic solenoids 12 and 13, like in the above-mentioned embodiments. There is no limitation, besides, on the direction for installing the casing 200*a*.

In the Stirling engines and the actuators of the above-mentioned first to third embodiments, the displacer operation means for operating the displacer is constituted by the moving yoke disposed in the displacer and the pair of electromagnetic solenoids disposed to surround the moving yoke in the casing and juxtaposed to each other in the axial direction. Therefore, the rod for driving the displacer does not penetrate through the casing with the consequence that the leakage of the operation gas can be prevented. Further, the displacer operation means is equipped with a starter function. Accordingly, there is no need of separately providing the starter mechanism. The operation cycle of the displacer can be easily changed by suitably controlling the timing for exciting the pair of electromagnetic solenoids. Besides, there is no limitation on the direction for installing the casing. In the present invention, further, the displacer is instantaneously switched over by the electromagnetic force of the displacer operation means and hence, has higher heat efficiency than that of the one of the crank shaft-coupling type.

Figure 7:
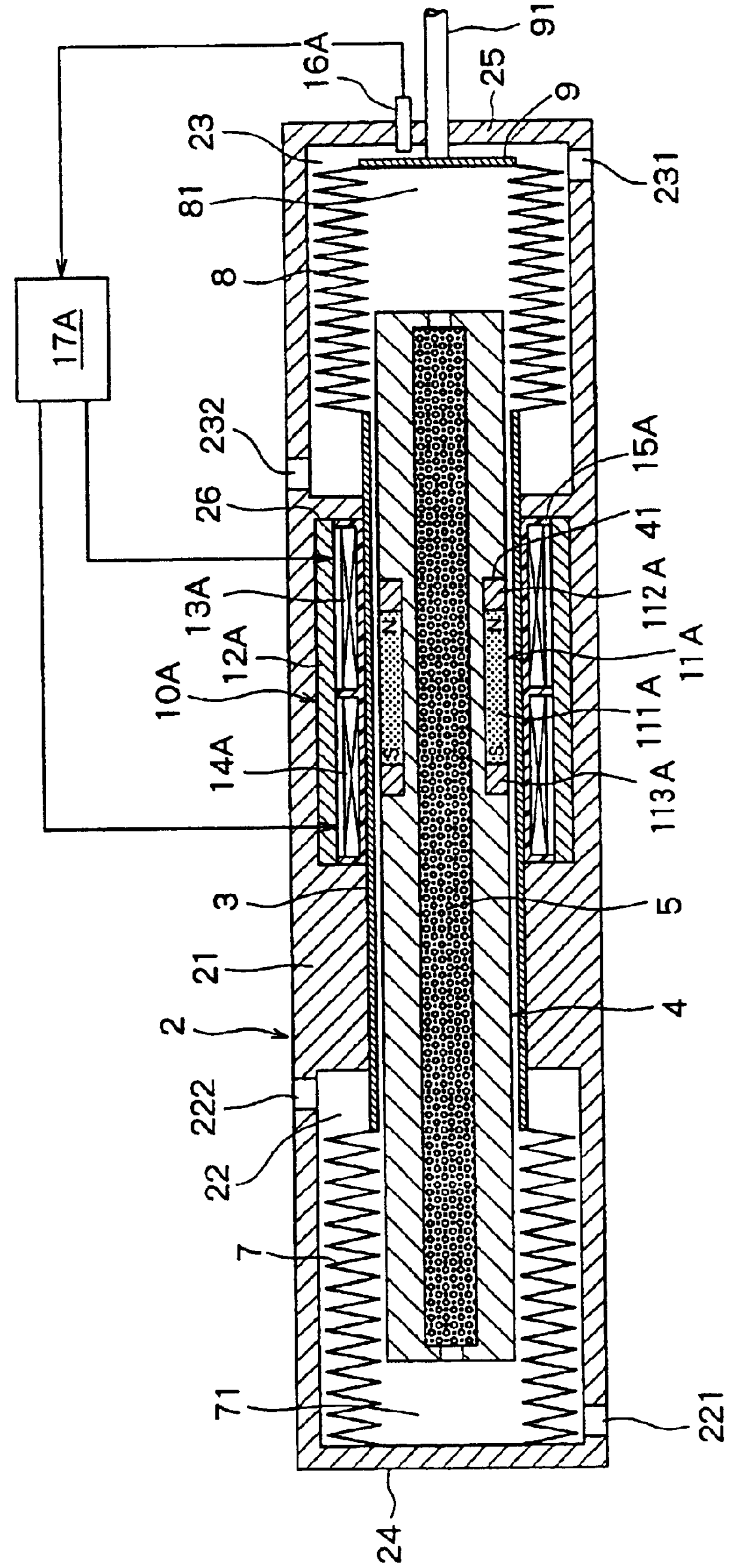
FIG. 7 is a sectional view showing a fourth embodiment of the Stirling engine constituted according to the present invention.

Next, a fourth embodiment of the Stirling engine constituted according to the present invention will be described with reference to FIG. 7. The Stirling engine of the fourth embodiment shown in FIG. 7 is different in only the constitution of the displacer operation means 10 in the Stirling engine of the first embodiment shown in FIG. 1. In other respects, however, the constitution is substantially the same as those of the first embodiment. Therefore, the same members as the constituent members of the of the first embodiment are denoted by the same reference numerals, but their description is not repeated.

The displacer operation means 10A constituting the Stirling engine of the fourth embodiment shown in FIG. 7 comprises a moving magnet 11A disposed on the outer peripheral surface at the central portion of the displacer 4, a fixed cylindrical yoke 12A disposed on the inside of the casing 2 to surround the moving magnet 11A, and a pair of coils 13A and 14A that are juxtaposed to each other in the axial direction and disposed on the inside of the fixed yoke 12A. The moving magnet 11A is constituted by an annular permanent magnet 111A mounted on the outer peripheral surface of the displacer 4 and having magnetic poles on both end surfaces thereof in the axial direction, and a pair of moving yokes 112A and 113A disposed on the outer sides of the permanent magnet 111A in the axial direction. The permanent magnet 111A in the illustrated embodiment has its right end surface magnetized to the N-pole in FIG. 7 and has its left end surface magnetized to the S-pole in FIG. 7. The pair of moving yokes 112A and 113A are formed in an annular shape by using a magnetic material. The thus constituted moving magnet 11A is disposed in an annular fitting groove 41 formed in the outer peripheral surface of the displacer 4.

The fixed yoke 12A is made of a magnetic material in a cylindrical shape, and is disposed in an annular fitting groove 26 formed in the inner peripheral surface of the casing 2. A pair of coils 13A and 14A are arranged on the inside of the fixed yoke 12A. The pair of coils 13A and 14A are wound reversely to each other on a bobbin 15A made of a nonmagnetic material such as a synthetic resin or the like and mounted along the inner periphery of the fixed yoke 12A. The pair of coils 13A and 14A are controlled to switch over the direction of applying an electric current by a control means that will be described later.

As described above, the displacer operation means 10A constituted by the moving magnet 11A, fixed yoke 12A and pair of coils 13A and 14A, operates based on the principle of a linear motor. The operation will be described below with reference to FIG. 8.

Figure 8:
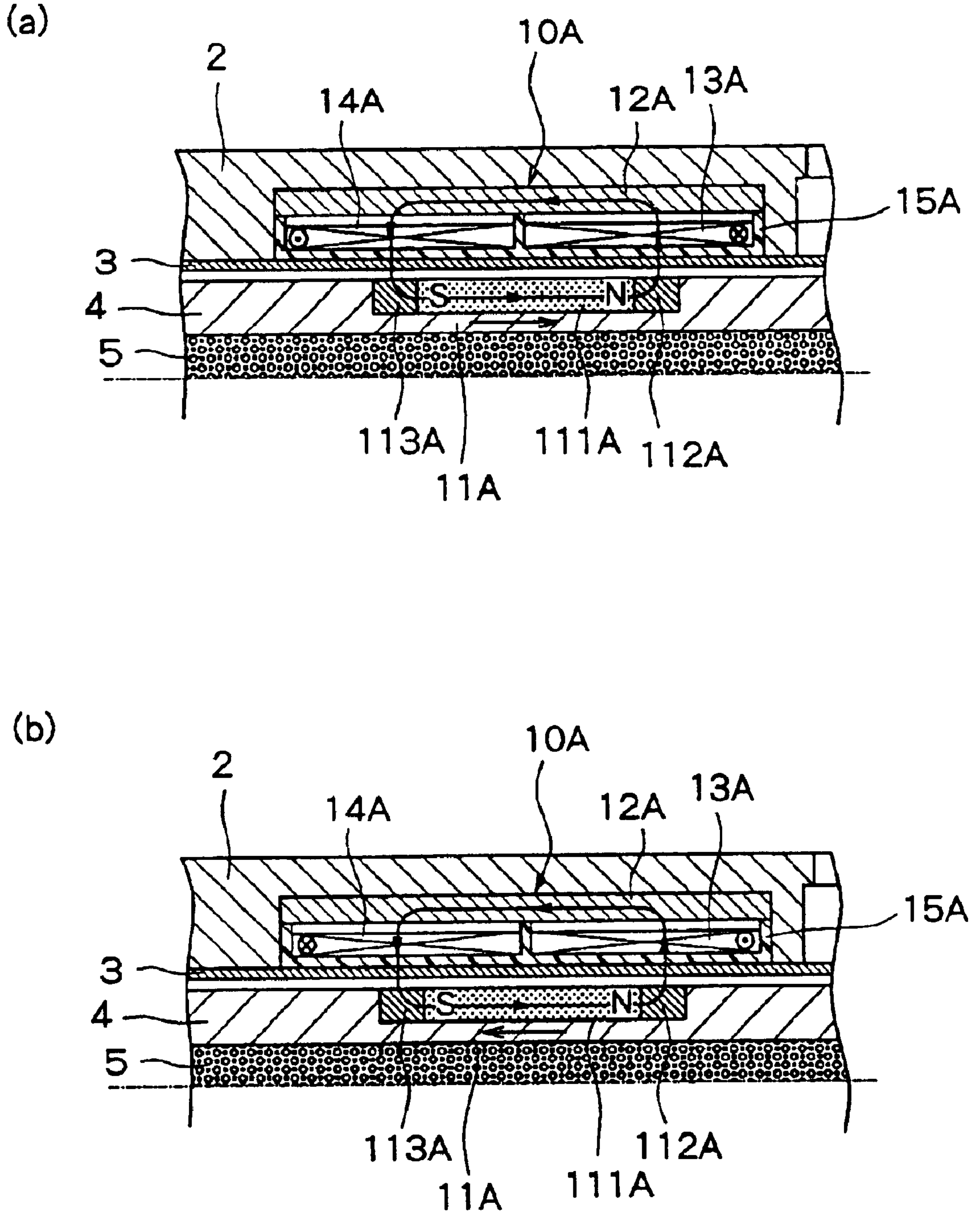
FIG. 8 is a view illustrating the operation of a displacer operation means which constitutes the Stirling engine shown in FIG. 7.

In the displacer operation means 10A of the illustrated embodiment, a magnetic circuit is formed, as shown in FIGS. 8(*a*) and 8(*b*) passing through the N-pole of the permanent magnet 111A, one moving yoke 112A, one coil 13A, fixed yoke 12A, other coil 14A, other moving yoke 113A and S-pole of the permanent magnet 111A. In this state, when electric currents are supplied to the pair of coils 13A and 14A in the opposite directions as shown in FIG. 8(*a*), the moving magnet 11, i.e., the displacer 4 produces a thrust toward the right as indicated by an arrow in FIG. 8(*a*) according to Fleming's left-hand rule. On the other hand, when electric currents are supplied to the pair of coils 13A and 14A as shown in FIG. 8(*b*), opposite to those of FIG. 8(*a*), the moving magnet 11, i.e., the displacer 4 produces a thrust toward the left as indicated by an arrow in FIG. 8(*b*) according to Fleming's left-hand rule.

The Stirling engine of the embodiment shown in FIG. 7 is provided with a power piston position detection means 16A for detecting the operation position of the power piston 9. The power piston position detection means 16A is constituted in the same manner as the power piston position detection means 16 of the above-mentioned first embodiment, and has output characteristics as shown in FIG. 2 above. The power piston position detection means 16A sends a detection signal to the control means 17A. The control means 17A is constituted by a microcomputer and has a central processing unit (CPU) for processing the operation according to a control program, a read-only memory (ROM) for storing the control program, and a random access memory (RAM) for storing the results of operation. Based on an operation position signal of the power piston 9 detected by the power piston position detection means 16A, the control means 17A sends a control signal to the pair of coils 13A and 14A constituting the displacer operation means 10A.

Figure 9:
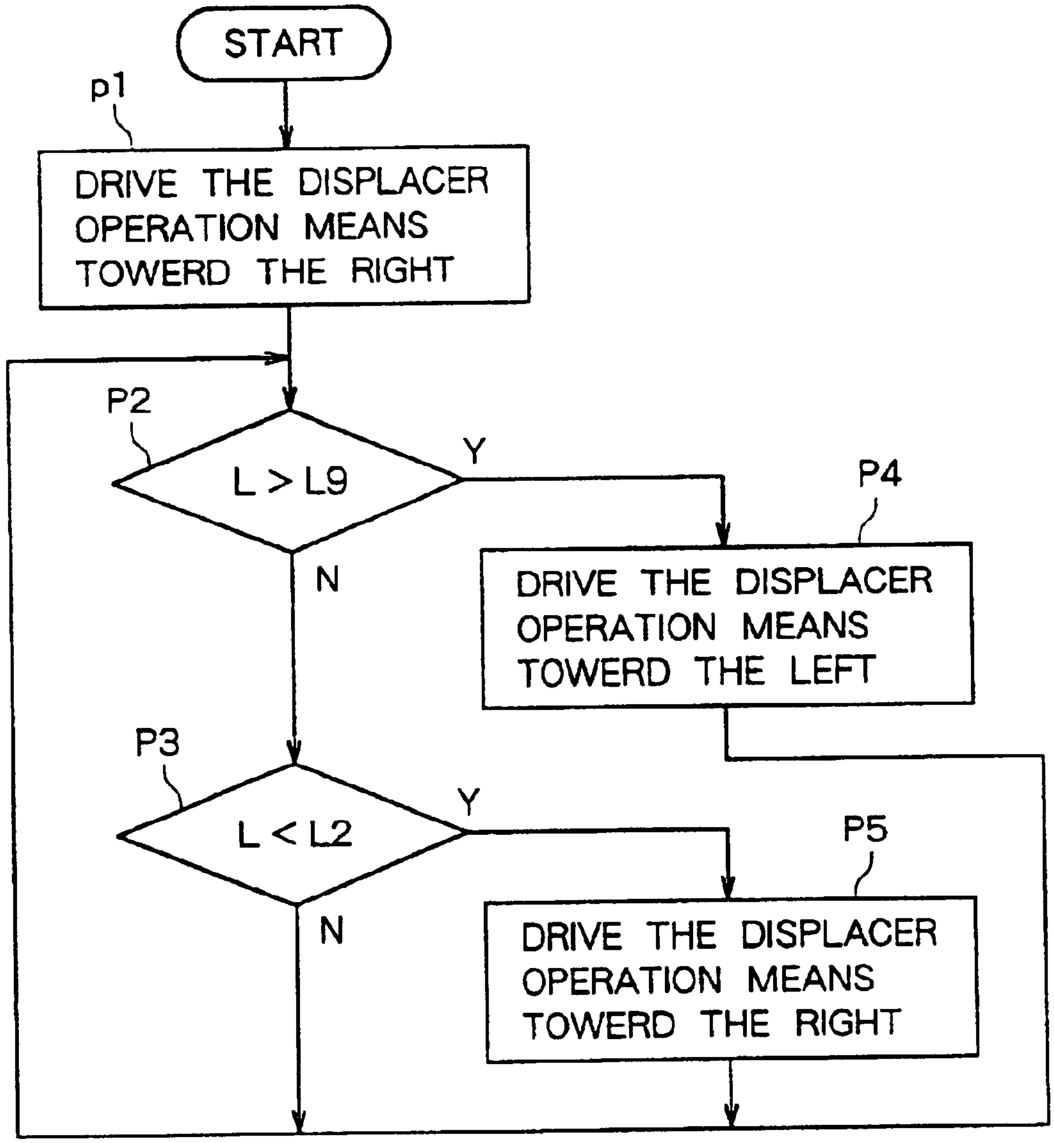
FIG. 9 is a flowchart showing the procedure of operation of control means constituting the Stirling engine shown in FIG. 7.

The Stirling engine of the fourth embodiment shown in FIG. 7 is constituted as described above. The operation will now be described with reference to a flowchart of FIG. 9 and FIG. 10 which illustrates the states of operation.

Figure 10:
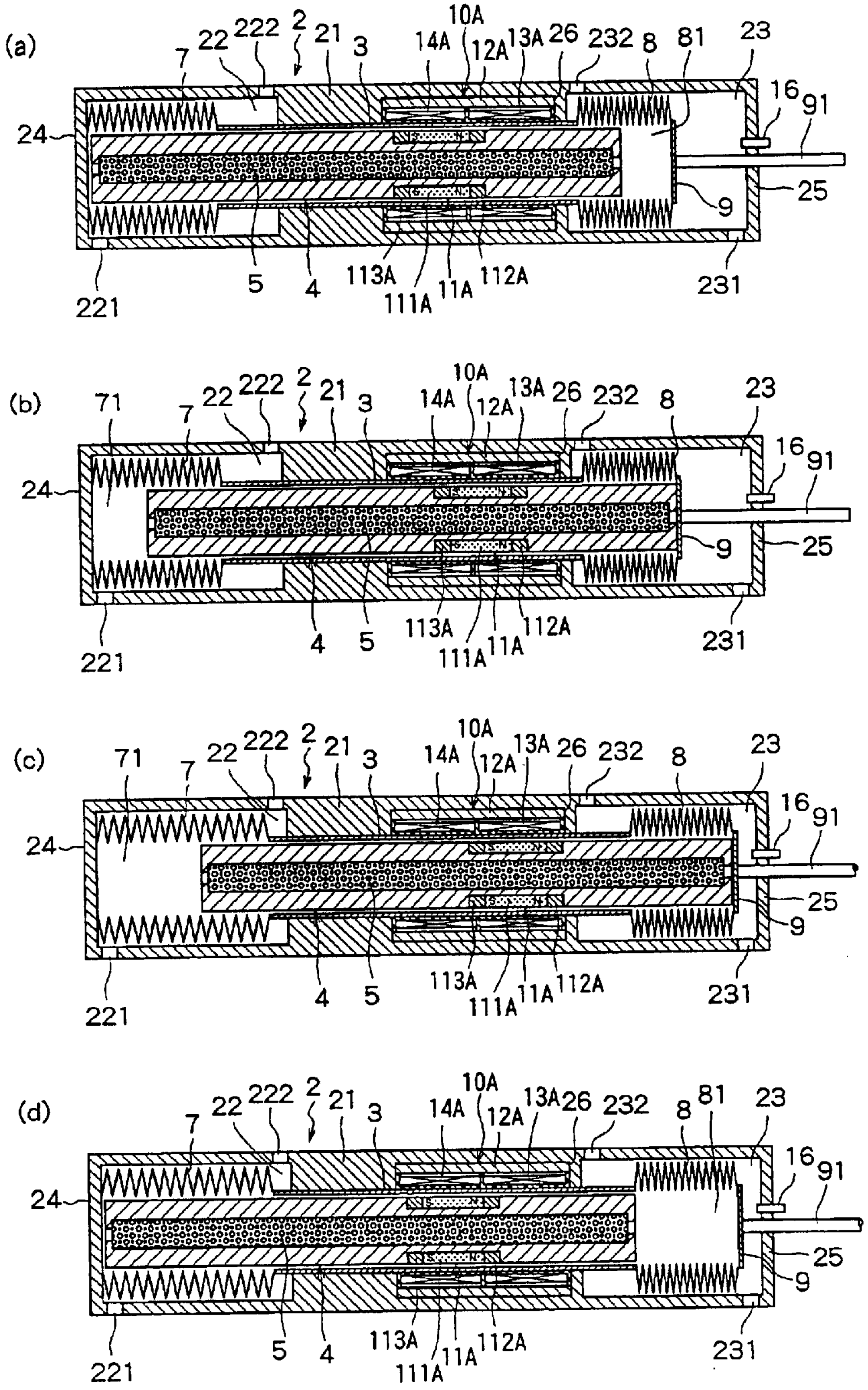
FIG. 10 is a view illustrating the operation states of the Stirling engine shown in FIG. 7.

FIG. 10(*a*) shows an end of contraction where the power piston 9 is at the left end position in the drawing, i.e., at the full-stroke position (bottom dead center) on the return side, and the displacer 4 is also at the left end position, i.e., at the full-stroke position (bottom dead center) on the return side. To start the Stirling engine from the state of FIG. 10(*a*), the control means 17A controls to drive the displacer operation means 10A so as to move the displacer 4 toward the right in the drawing (step P1). That is, the control means 17A controls to supply electric currents to the pair of coils 13A and 14A constituting the displacer operation means 10A in the opposite directions as shown in FIG. 8(*a*). As a result, the moving magnet 11A, i.e., the displacer 4 moves toward the right as shown in FIG. 10(*b*). As the displacer 4 moves toward the right, the operation gas in the operation chamber 81 flows into the expansion chamber 71 through the regenerator 5 disposed in the cylindrical displacer 4. At this moment, the operation gas cooled in the operation chamber 81 is heated by heat exchange caused at the time where it passes through the regenerator 5. As shown in FIG. 10(*b*), a state where the displacer 4 has moved toward the right by a predetermined amount is the time of starting expansion. From this moment, the operation gas that has flowed into the expansion chamber 71 undergoes the expansion by being heated by the heated fluid introduced into the heating chamber 22. As a result, the displacer 4 has its expansion bellows 7 expanded as shown in FIG. 10(*c*), whereby the slide cylinder 3 and the contraction bellows 8 move toward the right in the drawing, and the displacer 4 moves toward the right. At the end of expansion shown in FIG. 10(*c*), the power piston 9 is moved to the right end position, i.e., to the full-stroke position (top dead center) on the feed side, and the displacer 4, too, is moved to the right end position, i.e., to the full-stroke position (top dead center) on the feed side.

After the displacer operation means 10A is driven at step P1 to move the displacer 4 toward the right in the drawing as described above, the control means 17A proceeds to step P2 to check, based on a detection signal from the power piston position detection means 16A, whether the stroke position L of the power piston 9, i.e., of the power take-off shaft 91 is larger than a stroke position L9 which is a threshold value smaller, by a predetermined amount, than the full-stroke position (top dead center) L10 on the feed side (L>L9). AS the stroke position L is not larger than L9, the control means 17A proceeds to step P3 to check whether the stroke position L of the power piston 9, i.e., of the power take-off shaft 91 is smaller than a stroke position L2 which is a threshold value larger, by a predetermined amount, than the full-stroke position (bottom dead center) L1 on the return side (L<L2). This time, the power piston 9 is moved toward the feed side and hence, it does not happen that the stroke position L is smaller than L2. Accordingly, the control means 17A returns to the step P2.

When the stroke position L is larger than L9 at step P2, the control means 17A judges that the power piston 9 has exceeded the position which is smaller, by a predetermined amount, than the position at the end of expansion shown in FIG. 10(*c*). The control means 17A, then, proceeds to step P4 to drive the displacer operation means 10A so as to move the displacer 4 toward the left in the drawing. Namely, the control means 17A controls to supply electric currents to the pair of coils 13A and 14A constituting the displacer operation means 10A in the opposite directions shown in FIG. 2(*b*). As a result, the moving magnet 11A, i.e., the displacer 4 moves toward the left as shown in FIG. 10(*d*). As the displacer 4 moves toward the left, the operation gas in the expansion chamber 71 flows into the operation chamber 81 through the regenerator 5 disposed in the cylindrical displacer 4. At this moment, the operation gas heated in the expansion chamber 71 is cooled by heat exchange caused at the time when it passes through the regenerator 5. The state shown in FIG. 10(*d*) is the time of starting contraction where the displacer 4 reaches the left end position, i.e., reaches the full-stroke position (bottom dead center) on the return side. At the start of contraction which is the state shown in FIG. 10(*d*), the power piston 9 is located at the right end position in the drawing, i.e., located at the full-stroke position (top dead center) on the feed side. From the state shown in FIG. 10(*d*), the operation gas in the operation chamber 81 contracts by being cooled by the cold gas introduced into the cooling chamber 23. As a result, the contraction bellows 8 forming the operation chamber 81 contracts, and at the end of contraction shown in FIG. 10(*a*), the power piston 9 is moved to the left end position in the drawing, i.e., to the full-stroke position (bottom dead center) on the return side.

After the displacer operation means 10A is driven at step P4 to move the displacer 4 toward the left in the drawing as described above, the control means returns back to step P2 to check whether the stroke position L of the power piston 9, i.e., of the power take-off shaft 91 is larger than a stroke position L9 which is a threshold value smaller, by a predetermined amount, than the full-stroke position (top dead center) L10 on the feed side. This time, the power piston 9 is moved toward the return side, and it does not happen that the stroke position L is larger than L9. Accordingly, the control means 17A proceeds to step P3 to check whether the stroke position L of the power piston 9, i.e., of the power take-off shaft 91 is smaller than a stroke position L2 which is a threshold value larger, by a predetermined amount, than the full-stroke position (bottom dead center) L1 on the return side. When the stroke position L is not smaller than L2, the control means 17A judges that the power piston 9 does not yet reach L2. The control means 17A, therefore, returns back to step P2 to repeat steps P2 and P3. When the stroke position L of the power piston 9 is smaller than L2 at step P3, the control means 17A judges that the power piston 9 has exceeded L2. The control means 17A, therefore, proceeds to step P5 to control to supply electric currents to the pair of coils 13A and 14A in the opposite directions as shown in FIG. 8(*a*) to drive the displacer operation means 10A so as to move the displacer 4 toward the right in the drawing.

The above cycle is repeated to reciprocatingly move the power piston 9, i.e., the power take-off shaft 91. Therefore, when the power take-off shaft 91 is coupled to a crank shaft through a suitable connection rod, the crank shaft can be rotated.

In the above-mentioned fourth embodiment, the mechanism of the Stirling engine can be used as the actuator for actuating the to-be-operated member to the two positions by so controlling as to stop the displacer 4 at the full-stroke position (top dead center) on the feed side and at the full-stroke position (bottom dead center) on the return side and to stop the power piston 9, i.e., the power take-off shaft 91 at the full-stroke position (top dead center) L1 on the feed side and at the full-stroke position (bottom dead center) L1 on the return side. In this case, a switching-over signal may be input to the control means 17A. In this case, a means for inputting the switching-over signal to the control means 17A works as a switching-over means for switching over the directions of electric currents supplied to the pair of coils 13A and 14A.

In the Stirling engine and the actuator of the above-mentioned embodiment, the displacer operation means 10A for operating the displacer 4 is constituted by the moving magnet 11A disposed in the displacer 4, the fixed cylindrical yoke 12A disposed to surround the moving magnet 11A on the inside of the casing 2 and the pair of coils 13A and 14A juxtaposed in the axial direction on the inside of the fixed yoke 12A. Therefore, the rod for driving the displacer 4 does not penetrate through the casing 2 and hence, a sealed container can be formed and the leakage of the operation gas can be prevented. Further, the operation cycle of the displacer 4 can be easily changed by suitably controlling the timing for supplying the electric power to the pair of coils 13A and 14A. There is no limitation, besides, on the direction for arranging the casing 2.

Figure 11:
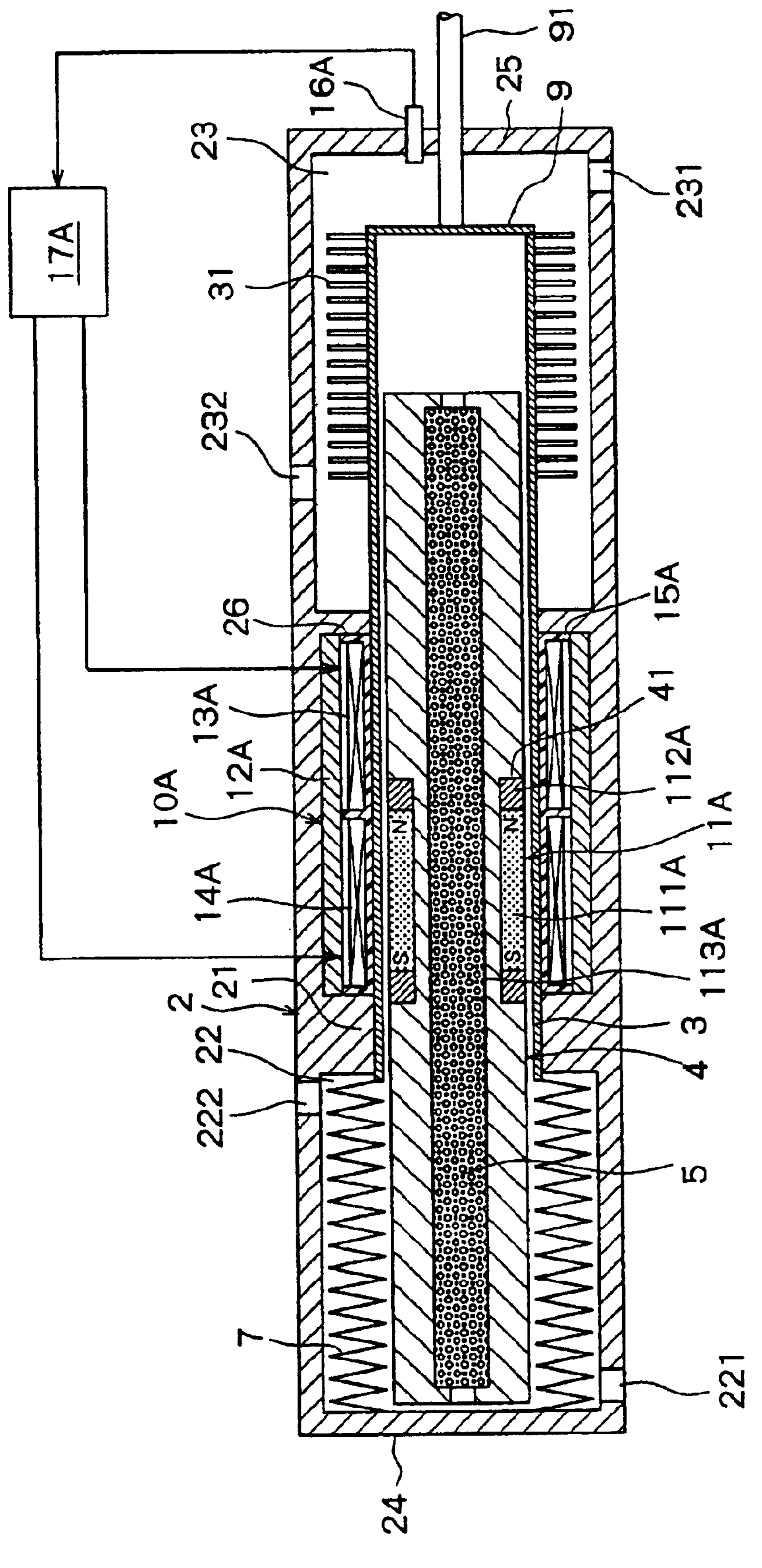
FIG. 11 is a sectional view showing a fifth embodiment of the Stirling engine constituted according to the present invention.

Next, a fifth embodiment of the Stirling engine constituted according to the present invention will be described with reference to FIG. 11. In the embodiment of FIG. 11, the same members as the constituent members of the Stirling engine shown in FIG. 7 are denoted by the same reference numerals, but their description is not repeated.

In the Stirling engine shown in FIG. 11, the slide cylinder 3 is formed in an extended manner instead of employing the contraction bellows 8 arranged in the cooling chamber 23 in the embodiment shown in FIG. 7, and the power piston 9 is attached to the right end of the slide cylinder 3 in the drawing. Then, cooling fins 31 are mounted on the outer periphery at the right end of the slide cylinder 3 in the drawing.

Figure 12:
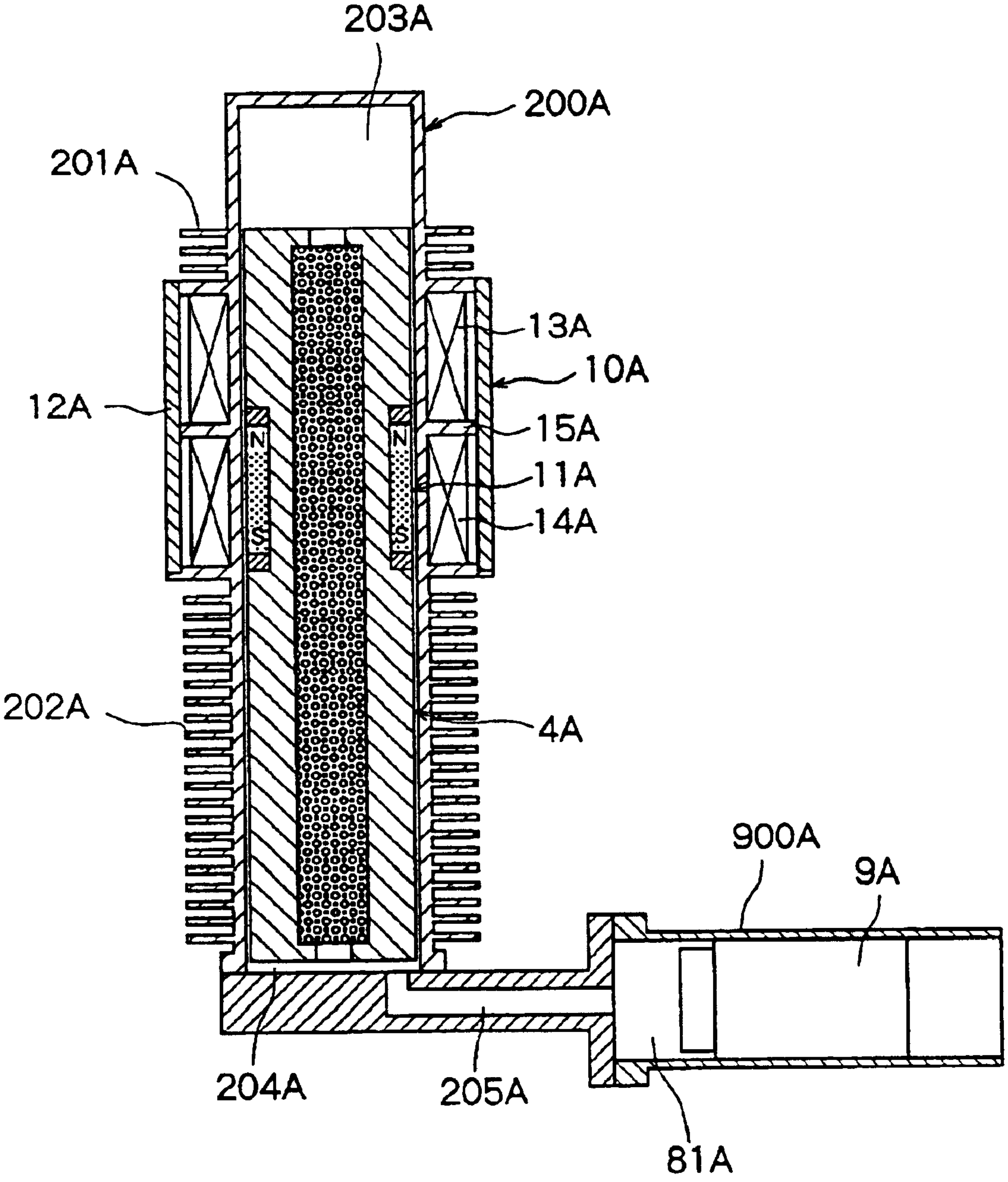
FIG. 12 is a sectional view showing a sixth embodiment of the Stirling engine constituted according to the present invention.

Next, a sixth embodiment of the Stirling engine constituted according to the present invention will be described with reference to FIG. 12. In the embodiment of FIG. 12, the same members as the constituent members of the Stirling engine shown in FIGS. 7 and 11 are denoted by the same reference numerals, but their description is not repeated.

The Stirling engine shown in FIG. 12 is the one of the type in which the displacer and the power piston are not arranged on the same axis, and to which the present invention is applied. Namely, in the Stirling engine shown in FIG. 12, a power cylinder 900A is arranged at right angles with a casing 200A, and a power piston 9A is arranged in the power cylinder 900A so as to slide therein. The casing 200A is made of a metallic material such as an aluminum alloy or the like and is formed with its both ends closed. In the drawing, heating fins 201A are formed on the outer peripheral surface at the upper end thereof, and cooling fins 202A are formed on the outer peripheral surface of the lower half portion thereof. In the thus constituted casing 200A, the displacer 4 is arranged so as to move up and down in the drawing. Due to the displacer 4, therefore, the interior of the casing 200A is divided into an expansion chamber 203A of the upper side in the drawing and a cooling chamber 204A of the lower side in the drawing. The cooling chamber 204A is communicated, via a passage 205A, with an operation chamber 81A formed by the power cylinder 900A and the power piston 9A. The moving magnet 11A of the displacer operation means 10A which periodically operates the displacer 4 is arranged on the outer peripheral surface at the central portion of the displacer 4, and the fixed yoke 12A as well as the pair of coils 13A and 14A are arranged in the casing 200A. As described above, the displacer operation means 10A for periodically operating the displacer 4 is constituted by the moving magnet 11A disposed in the displacer 4, the fixed yoke 12A disposed in the casing 200A, and the pair of coils 13A and 14A. Therefore, the rod for driving the displacer 4 does not penetrate through the casing 200A with the consequence that the leakage of the operation gas can be prevented. The operation cycle of the displacer 4 can be easily changed by suitably controlling the timing for supplying an electric power to the pair of coils 13A and 14A, like in the above-mentioned embodiments. There is no limitation, besides, on the direction for installing the casing 200A.

In the Stirling engines and the actuators of the above-mentioned fourth to sixth embodiments, the displacer operation means for operating the displacer is constituted by the moving magnet disposed in the displacer, the fixed cylindrical yoke disposed in the casing to surround the moving magnet and the pair of coils arranged inside the fixed yoke. Therefore, the rod for driving the displacer does not penetrate through the casing and hence, a sealed container can be formed and the leakage of the operation gas can be prevented. Further, the displacer operation means is equipped with a starter function. Accordingly, there is no need of separately providing the starter mechanism. The operation cycle of the displacer can be easily changed by suitably controlling the timing for supplying the electric power to the pair of coils. Besides, there is no limitation on the direction for installing the casing. In the present invention, further, the displacer is instantaneously switched over by switching over the electric currents supplied to the pair of coils of the displacer operation means and hence, has higher heat efficiency than that of the one of the crank shaft-coupled type.

What I claim is:

1. A Stirling engine comprising a casing, a displacer arranged in said casing so as to slide, an expansion chamber and an operation chamber into which, and from which, an operation gas flows with the operation of said displacer, and a power piston that is operated in response to a change in the pressure of the operation gas in said operation chamber, wherein said Stirling engine further comprises:

a displacer operation means having a moving yoke disposed in said displacer, and a pair of electromagnetic solenoids disposed to surround said moving yoke and juxtaposed to each other in the axial direction in said casing;

a power piston position detection means for detecting the operation position of said power piston; and a control means for controlling to switch over the excitation of the pair of electromagnetic solenoids of said displacer operation means based on a detection signal from said power piston position detection means.

2. The Stirling engine of claim 1, wherein:

said pair of electromagnetic solenoids comprise a fixed cylindrical yoke disposed to surround said moving magnet in said casing, and a pair of coils disposed on the inside of said fixed yoke, and said control means switches over the excitation of said pair of electromagnetic solenoids by switching over the direction of an electric current supplied to said pair of coils.

* * * * *